(12) United States Patent
Miller

(10) Patent No.: US 9,122,913 B2
(45) Date of Patent: Sep. 1, 2015

(54) METHOD FOR LOGGING A USER IN TO A MOBILE DEVICE

(71) Applicant: ArtiVision Technologies Ltd., Singapore (SG)

(72) Inventor: Ofer Miller, Sawon (IL)

(73) Assignee: ARTIVISION TECHNOLOGIES LTD., Singapore (SG)

( * ) Notice: Subject to any disclaimer, the term of this patent is extended or adjusted under 35 U.S.C. 154(b) by 98 days.

(21) Appl. No.: 14/035,850

(22) Filed: Sep. 24, 2013

(65) Prior Publication Data

US 2015/0049922 A1    Feb. 19, 2015

(30) Foreign Application Priority Data

Aug. 19, 2013  (SG) ............................... 210306300-3

(51) Int. Cl.
  *G06K 9/00* (2006.01)
  *H04L 29/06* (2006.01)
  *H04W 12/06* (2009.01)
(52) U.S. Cl.
  CPC ........ *G06K 9/00288* (2013.01); *G06K 9/00255* (2013.01); *H04L 63/083* (2013.01); *H04L 63/0861* (2013.01); *H04W 12/06* (2013.01)

(58) Field of Classification Search
  None
  See application file for complete search history.

(56) References Cited

U.S. PATENT DOCUMENTS

| 8,370,639 | B2 * | 2/2013 | Azar et al. ..................... 713/186 |
| 8,752,145 | B1 * | 6/2014 | Dotan et al. ...................... 726/6 |
| 8,910,299 | B2 * | 12/2014 | Michalske ....................... 726/27 |
| 8,959,359 | B2 * | 2/2015 | White et al. ................... 713/186 |

\* cited by examiner

*Primary Examiner* — Randolph I Chu
(74) *Attorney, Agent, or Firm* — Hershkovitz & Associates, PLLC; Abe Hershkovitz

(57) ABSTRACT

A method is provided for logging a first user in to a mobile device being in a locked mode. The method comprising: storing a password associated with the first user and information that relates to a facial image of that first user; when the mobile device is in a locked mode: receiving a password inserted by a user; comparing the received password with the stored password and determining whether they match; if a match is found, prompting an image capturing device to capture an image; retrieving information that relates to a facial image from the captured image and comparing that information with the stored information; if the retrieved information matches the stored information, unlocking the mobile device.

9 Claims, 3 Drawing Sheets

METHOD FOR LOGGING A USER IN TO A MOBILE DEVICE

TECHNICAL FIELD

The present invention relates in general to the field of image processing, and in particular to methods and means for authenticating a user who logs in to a mobile computing device.

BACKGROUND

A typical facial recognition system is a computer application used for automatically identifying or verifying a person from a digital image or a video frame. One of the ways to carry out this task is by comparing selected facial features from the image with a database containing facial related data. It is typically used for security applications and is quite often supplemented by comparing also other biometrical characteristics such as fingerprint and eye iris.

Some facial recognition algorithms have been developed that are able to identify faces by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face detection. A probe image is then compared with the face data.

Typically, in the field of computer security, the user's access to a computerized system during a login process is controlled by identifying the user through the use of security credentials provided by the user. Mobile computing devices (e.g. mobile devices such as laptops, smart phones) may be locked or otherwise secured to prevent their unauthorized usage, and during the login process a user is required to perform some affirmative action (e.g., enter a password, type a key combination, move the mouse, swipe a finger across the screen, etc.) to unlock the computer.

US2003215114 for example, describes a security system that utilizes an identity verification system having a biometrics component, such as a face, fingerprint, or iris recognition system. The system connects a biometric data entry device such as a standard analogue or digital camera to a communication control device which captures, compresses and digitizes the biometric data as well as converts data from data input devices and sends the compressed and digitized biometric data along with the data from a data input device to a central processing unit for processing by a biometric recognition system and comparison to stored biometric data.

U.S. Pat. No. 8,261,090 describes a method of logging a user to a mobile computing device by receiving an image of the user via a camera coupled with the mobile computing device and determining the identity of the user based on the received image. If the determined identity which is based on the received image matches a predetermined identity, then, if the identity of the user matches the predetermined identity, the user may be logged in to the mobile computing device.

US 20130015946 discloses methods for authenticating a user to a mobile computing device. Upon receiving a user's request to unlock a mobile device in a locked state, one or more images of the face of the user are captured. Facial components of the user from the one or more captured images are extracted and then a determination is made as to whether the user is an authorized user or a unauthorized user based on a comparison of the facial components of the user extracted from the one or more captured images to facial components of the authorized user from one or more authentication images of the authorized stored on the mobile device. If the user is determined to be an authorized user, the mobile device unlocks; otherwise, the mobile device is maintained in its locked state.

US 20120235790 describes a method by which a locked mobile device is configured to capture an initial image using its camera, capture a new image in response to detecting movement of the device, determine that the device moved to a use position, capture a subsequent image in response to determining that the device moved to a use position, analyze the subsequent image to detect a user's face, and unlock the device in response to detecting that the user's face is of the authorized user.

However, none of the proposed methods adequately address the practical need of reducing consumption of the device resources to a minimum, while gaining a secured access to the mobile computing device which is in a locked mode, all without adversely affecting the user experience.

SUMMARY OF THE DISCLOSURE

It is therefore an object of the present invention to provide a device and a method for allowing a securely enhanced authentication process for logging in to a mobile computing device.

It is another object of the invention to provide a device and a method for enabling a user to log in to a mobile computing device by using a passive facial recognition process in order to minimize interactions with the user during the log in process.

It is another object of the invention to provide a device and a method for applying information retrieved in a facial recognition process for logging in to a mobile computing device.

It is yet another object of the present invention to provide a device and a method for carrying out an authentication process as part of logging in to a mobile computing device, while minimizing the amount of the device resources that are utilized during that process.

Other objects of the present invention will become apparent as the description of the invention proceeds.

The disclosure may be summarized by referring to the appended claims.

According to a first embodiment, there is provided a method of logging a first user in to a mobile computing device (e.g. a laptop, a mobile telephone and the like), which comprises:

(a) storing data (e.g. a password) associated with the first user and information that relates to a facial image of that first user (e.g. a digital representation of the user's image, one or more characteristic features of the user's image, etc.) at a memory of the mobile computing device;

(b) when the mobile computing device is in a locked mode (i.e. that no access the resources of the mobile computing device is granted):

(b.1) receiving data inserted by a user who wishes to unlock the mobile computing device;

(b.2) comparing the received data with the stored data (password) associated with the first user and determining whether the received data matches the stored data associated with the first user;

(b.3) if it has been determined that the received data matches the stored data associated with the first user prompting an image capturing device associated with the mobile computing device to capture an image;

(b.4) processing the image captured and extracting information from the processed image;

(c) if the extracted information matches the information relating to the facial image of the first user which had been stored at the memory of the mobile computing device, unlocking the mobile computing device (e.g. enabling unlimited access to resources of the mobile computing device).

The term "facial image" as used herein throughout the specification and claims is used to denote any image onto which applying a facial recognition process would yield enough information to successfully complete the facial recognition process. Thus, the facial image may be retrieved from an image taken while the first user was facing an image capturing means (e.g. a camera, whether of his mobile computing device or whether a different camera) and then processed to obtain the information that relates to the facial image of that first user, or the facial image may be retrieved from a different database (e.g. Facebook™, Instagram™ and the like) and then processed to obtain the information that relates to the facial image of that first user.

According to another embodiment, the data associated with the first user (e.g. the password) is selected from among alphanumeric information and/or one or more gestures received in a touch sensitive area of the mobile computing device.

According to another embodiment, in case the image captured in step b.3 cannot be used for extracting enough information in order to carry out a matching process with the information relating to the facial image of the first user which has been stored at the memory of the mobile computing device (e.g. in case the captured image does not include a facial image of any user or if the facial image includes only a partial image of a user, in other words, in case no meaningful facial recognition process may be carried out based on the captured image), the method further comprises the steps of:

(d.1) enabling limited access to resources of the mobile computing device;

(d.2) triggering the image capturing device to capture another image and processing the newly captured image; and (d.3) if the newly captured image cannot be used for extracting enough information in order to carry out a matching process with the information relating to the facial image of the first user which had been stored at the memory of the mobile computing device, repeating steps d.2 and d.3 for up to a pre-defined number of times; and (d.4) if after that pre-defined number of times, no match has been found between the extracted information and the information relating to the facial image of the first user which has been stored at the memory of the mobile computing device, logging off the user who was granted with a limited access to the mobile computing device.

The term "limited access" as used herein throughout the specification and claims, is used to denote limited access to resources of the mobile computing device, wherein that limited access can be with respect to the resources to which that user may access (e.g. denying access to certain applications such as an e-mail applications), or may be limited with respect to the period of time that the limited access is granted (e.g. a number of minutes), or any combination thereof.

According to another embodiment, step d.2 is repeated for up to a pre-defined number, as long as the newly captured image cannot be applied for extracting enough information in order to carry out a matching process with the information relating to the facial image of the first user which has been stored at the memory of the mobile computing device, and wherein hitting a key at the mobile computing device keyboard or making a gesture at a touch sensitive area of the mobile computing device, triggers the capturing of a new image.

According to yet another embodiment, if the retrieved information relating to a facial image of the user who inserted the received data has been successfully processed but does not match the information relating to the facial image of the first user which had been stored at the memory of the mobile computing device, denying access to the mobile computing device resources (e.g. leaving the mobile computing device in a locked mode) from the user whose facial image has been captured and processed.

In accordance with still another embodiment, the retrieval of information that relates to a facial image of the user comprises processing the facial image to identify therefrom at least one characteristic of the user.

The term "at least one characteristic" that relates to the user, as used herein and throughout the description and claims should be understood to encompass one or more features comprised in the facial image of the user, whether this one or more feature is unique to that user or whether the one or more features are classifying characteristics such as ethnic group, gender, age group etc., that are retrievable from the individual facial image.

By yet another embodiment, the processing of the facial image comprises extracting at least one unique facial signature from the user facial image and matching each of the extracted unique signatures with facial signatures related data comprised in the memory of the mobile computing device. For example, the extracted signature represents facial related data, which in turn represents unique features of the processed facial image.

According to another embodiment, the processing of the facial image is carried out by using an image capturing device which is different from the image capturing device operatively coupled with the mobile computing device, for generating the information that relates to a facial image of the first user that has been stored at a memory of the mobile computing device.

In accordance with still another embodiment, the at least one characteristic of the user is based on one or more of: a relative position, size, and/or shape of the eyes, nose, cheekbones, and/or jaw of the user in the facial image of the user.

By yet another embodiment, the at least one characteristic of the user comprises a general classification thereof. Preferably, the general classification comprises at least one member of the group consisting of the following characterizing features: gender, age, and ethnicity.

In other words, the processing step may take into consideration one or more of the above factors while evaluating the facial image of an individual, so that these factors may be cancelled out while generating the facial signature of the user.

According to another aspect there is provided a two stage method of logging a first user in to a mobile computing device comprising:

(a) storing at the memory of the mobile computing device user identification data of two types, wherein the first type of identification data is characterized in that it consumes a small amount of resources (e.g. computing resources, power resources) of the mobile computing device (e.g. a password) for comparing the stored identification data of the first type with data of the first type that would be introduced to the mobile computing device, and wherein the second type of identification data is characterized in that it consumes a substantially larger amount of the mobile computing device resources (e.g. identification by a facial image, by a voice print, by a fingerprint, etc.) than the identification data of the first type, for comparing the stored identification data of the second type with data of the second type that would be introduced to the mobile computing device;
  (b) when the mobile computing device is in a locked mode:
    (b.1) receiving data of the first type, inserted by a user who wishes to unlock the mobile computing device;
    (b.2) comparing the received data of the first type with the stored identification data of the first type associated with said first user, and determining whether the received data of the first type matches the stored identification data of the first type;
    (b.3) if it has been determined that the received data of the first type matches the stored identification data of the first type associated with the first user, enabling capturing of data of the second type associated with the user who wishes to unlock the mobile computing device;
    (b.4) using the captured data of the second type for matching same with identification data of the second type associated with the first user, that had been stored at the memory of the mobile computing device;
  (c) if it has been determined that the received data of the second type matches the stored identification data of the second type associated with the first user, unlocking the mobile computing device.

According to another embodiment of this aspect, the identification data of the second type stored in the mobile computing device comprises data that belong to at least two different classes of data, e.g. a class that includes data that relates to facial image recognition, a class that includes data that relates to voice print recognition, a class that includes data that relates to fingerprinting recognition, and the like.

By yet another embodiment, the method provided further comprising a step wherein if the captured data of the second type does not contain enough information for matching same with identification data of the second type associated with the first user that had been stored at the memory of the mobile computing device, step b.3 comprises enabling capturing of data that belong to a different class of the second type associated with the user who wishes to unlock the mobile computing device which is different from the captured data of the second type that has not contained enough information for carrying out the matching process. For example, if only a partial facial image was captured that did not allow carrying a facial recognition process of the person whose partial image was captured, prompting the microphone of the mobile computing device to capture a voice print data of the user who is currently at the vicinity of the mobile computing device.

According to another aspect there is provided a mobile computing device comprising:
a power source (e.g. a battery);
an image capturing device;
a user interface configured to enable a user to insert a password;
a memory or storage device storing: a) a password associated with the first user (or possibly a number of passwords associated either with the first user or with different users); b) information that relates to a facial image of the first user (or possibly a number of facial images associated with the first user and with a number of other users); c) a program;
one or more processing units operable to execute the program, wherein the execution of the program causes the one or more processing units to carry out the following operations when the mobile computing device is in a locked mode:
  to process data inserted via the user interface by a user who wishes to unlock the mobile computing device;
  to compare the inserted data with the password associated with the first user that has been stored at the memory or storage device and to determine whether the inserted data matches the password associated with the first user;
  if the inserted data matches the password associated with the first user, prompting the image capturing device to capture a facial image of the user who inserted the data;
  to retrieve information that relates to a facial image of the user who inserted the data and to compare that information with information that has been stored at the memory or storage device, wherein the latter information relates to the facial image of the first user;
  if the retrieved information which relates to a facial image of the user who inserted the data matches the information which has been stored at the memory or storage device and relates to the facial image of the first user, prompting the unlock of the mobile computing device.

According to another embodiment, in case the facial image of the user who inserted the data that was captured by the image capturing device, cannot be used for extracting enough information in order to carry out a matching process with the information relating to the facial image of the first user which had been stored at the memory of the mobile computing device, the one or more processing units are further configured to carry out the following operations:
  to enable limited access to resources of the of the mobile computing device;
  to prompt the image capturing device to capture another image and to process the newly captured image; and
  if the newly captured image cannot be used for extracting enough information in order to carry out a matching process with the information relating to the facial image of the first user which had been stored at the memory of the mobile computing device, repeating the steps of capturing the image and processing it for up to a pre-defined number of times; and
  if after that pre-defined number of times, no match has been found between the extracted information and the information relating to the facial image of the first user which has been stored at the memory of the mobile computing device, to automatically log off the user to a limited access to the mobile computing device was granted.

According to another embodiment, the one or more processing unit are configured to repeat prompting the image capturing device to capture an image, and to process it for up to a pre-defined number of times, as long as the newly captured image cannot be applied for extracting enough information in order to carry out a matching process with the information relating to the facial image of the first user which has been stored at the memory of the mobile computing device, and wherein hitting a key at the mobile computing device keyboard or making a gesture at a touch sensitive area of the mobile computing device, triggers the prompting of capturing a new image.

According to yet another embodiment, if the retrieved information relating to a facial image of the user who inserted the received data has been successfully processed but does not match the information relating to the facial image of the first user which had been stored at the memory of the mobile computing device, the one or more processing units are configured to deny access to the mobile computing device resources from the user whose facial image has been captured and processed.

According to another embodiment, the memory or storage device is further configured to store facial signatures related data and the one or more processing units are further operable to extract at least one unique facial signature of the user and to match each of the unique signatures with facial signatures related data that are stored at the memory or storage device.

By yet another embodiment, the one or more processing units are further operable to process a facial image when captured by an image capturing device different from the image capturing device, and to generate information that relates to a facial image of the first user that would be stored at the memory or storage device. For example, if the information that will eventually be used to authenticate the user was derived from an image selected from among photos which the user had stored in one or more databases associated with respective social networks to which the user belongs.

In accordance with another aspect there is provided a computer program product stored on a non-transitory tangible computer readable medium and comprising instructions that, when executed, cause a mobile computing device comprising one or more computer processors to perform a method, the method comprising:

(a) storing a password associated with a first user and information that relates to a facial image of the first user;

(b) receiving data inserted by a user;

(c) comparing the received data with the password associated with the first user, and determining whether the received data matches the password associated with the first user;

(d) if the received data matches the password associated with the first user, prompting an image capturing device to capture a facial image of the user who inserted the data received;

(e) retrieving information that relates to a facial image of the user who inserted the received data, and comparing that information with information that has been stored at the memory of the mobile computing device, wherein the latter information relates to the facial image of that first user;

(f) if the retrieved information relating to a facial image of the user who inserted the received data matches the information relating to the facial image of the first user which has been stored at the memory of the mobile computing device, prompting unlock of the mobile computing device.

According to another embodiment, in case the captured facial image captured cannot be used for extracting enough information in order to carry out a matching process with the information relating to the facial image of the first user which has been stored at the memory of the mobile computing device, the method further comprises the steps of:

(g) enabling limited access to resources of the of the mobile computing device;

(h) triggering the image capturing device to capture another image and processing the newly captured image; and (i) if the newly captured image cannot be used for extracting enough information in order to carry out a matching process with the information relating to the facial image of the first user which had been stored at the memory of the mobile computing device, repeating steps d.2 and d.3 for up to a pre-defined number of times; and (j) if after that pre-defined number of times, no match has been found between the extracted information the information relating to the facial image of the first user which has been stored at the memory of the mobile computing device, logging off the user who was granted with a limited access to the mobile computing device.

DETAILED DESCRIPTION

A better understanding of the present invention will now be obtained when the following non-limiting detailed description is considered in conjunction with the following drawings.

By implementing a method of a two stage authentication process as proposed herein for logging in to a mobile device, a meaningful advantage is obtained over the prior art solutions. A mobile computing device is a device which its resources are restricted by their very own nature (computing resources, energy available, etc.) due to the fact that it is most of the time disconnected from the electricity grid. However, the solution provided by the present invention enables saving of these resources by using the two stage technique described herein, whereby only limited resources are consumed while carrying out the first stage of the authentication, and whenever the first stage has been successfully completed, the second stage, which consumes more of the mobile device resources, will be carried out. This solution offers both an enhanced secured log-in procedure (going through two user's independent authentication stages) and minimizing the utilization of the mobile device resources, as the second stage will not be prompt (nor the devices that are responsible to retrieve the identification data of the second type, e.g. facial images, voice prints, etc.). One of the important outcomes in applying such a two stage method is, that if the user leaves the mobile device (e.g. a smartphone) for some time, unauthorized person(s) might try to access the device, and if not for the first stage which consumes small amount of the mobile device resources, every time such an unauthorized attempt is made, a facial image would have to be taken, be analyzed and compared with a facial image stored in the memory of the mobile device. This waste of resources is eliminated by the fact that the unauthorized attempts will not be able to pass the first stage of the authentication process.

Figure 1:
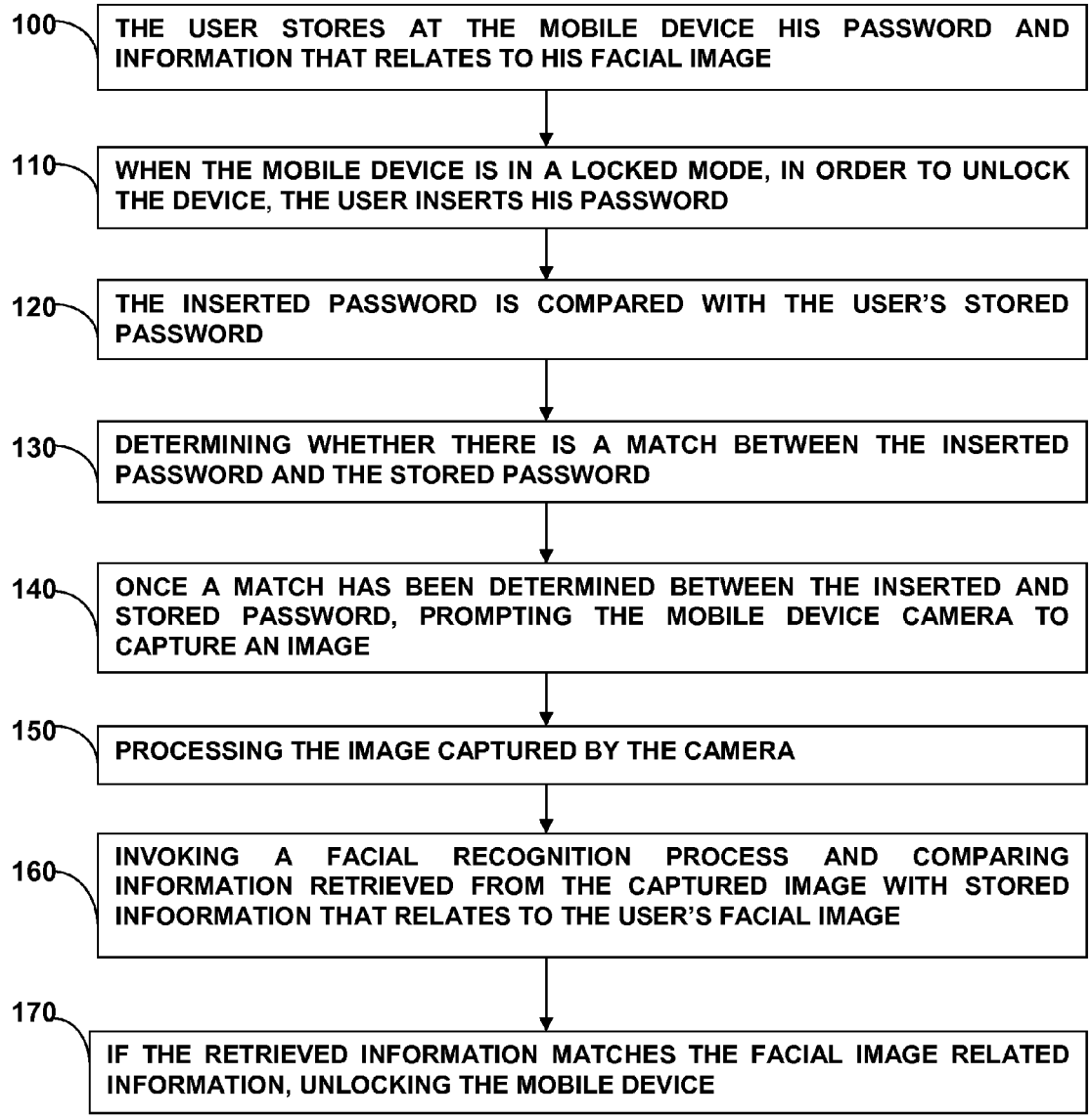
FIG. 1 is a flow chart illustrating one embodiment of the present invention.

Let us first consider FIG. 1 which illustrates a flow chart of an example where a user of a mobile computing device such as a laptop, mobile telephone and the like, having an image capturing means such as a camera associated therewith (e.g. being an integral part of the mobile computing device), wishes to unlock his mobile computing device after a certain period of time during which that device was not in use.

First, in order to implement the embodiment that will be described hereinbelow, the user stores his password at the mobile computing device memory as well as information that relates to his facial image (step 100). This information that relates to the user's facial image may be stored in any one of a number of ways such as a digital representation of the user's image, one or more features characterizing the user's image, a facial signature of the user, etc., or any other way that is known in the art per se that would allow comparing another image of that user (either with or without extracting certain information from the other image) with the information that has been stored.

Then, when the mobile computing device is in a locked mode whether because the user has turned the mobile computing device off (or logged out) or due to non-use of the mobile computing device for a certain period of time, as specified in the device operating definitions, and the user wishes to regain access the resources of the mobile computing device, the following steps of a two stage authentication process are taken.

First, the user inserts his password (step 110). This step can be done by inserting alphanumeric information or by making one or more gestures in a touch sensitive area of the mobile computing device (if the mobile computing device has a touch screen), or a combination thereof.

Once the password related data has been inserted by the user, it is compared (step 120) with the data associated with the user's password, which had already been stored in the memory of the mobile computing device. Then, it is determined whether the received data matches the password associated with that user (step 130). As long as the data inserted by the user does not match the data of the password that had been stored in the device memory, the device will remain in a locked mode.

However, if the password data inserted by the user does match the stored password data, an image capturing device associated with the mobile computing device (e.g. its camera) is prompted to capture a facial image of the user currently facing the mobile computing device (who is assumed to be the person who inserted the password data) (step 140).

As soon as the user image has been captured, the image is processed (step 150) and a facial recognition process is invoked in order to compare information retrieved from the image captured with the information that has been stored at the memory of the mobile computing device (step 160).

In order to decrease the response time of the mobile computing device, the facial image of the user is processed and a unique face signature is extracted therefrom. The extracted signature represents the facial data, which contains unique features of the processed face. Also, the programmable engine is adapted to handle various real-time changes, caused due to variable situations, such as:

i. Camera differences: when the camera used in the process of generating the facial signature is differs from the camera used to perform the live recognition;

ii. Environment difference: when the image that includes the user's face was taken under different environment (e.g. lightening conditions) compared with the environment at which the live recognition is performed; and iii. Database difference: people of different ethnicity might have different unique characteristics, which should be taken into account when deciding whether two signatures belong to the same user.

If the retrieved information relating to the facial image of the user who inserted the data received, matches the information relating to the facial image of the first user which has been stored at the memory of the mobile computing device, unlocking the mobile computing device (step 170).

Figure 2:
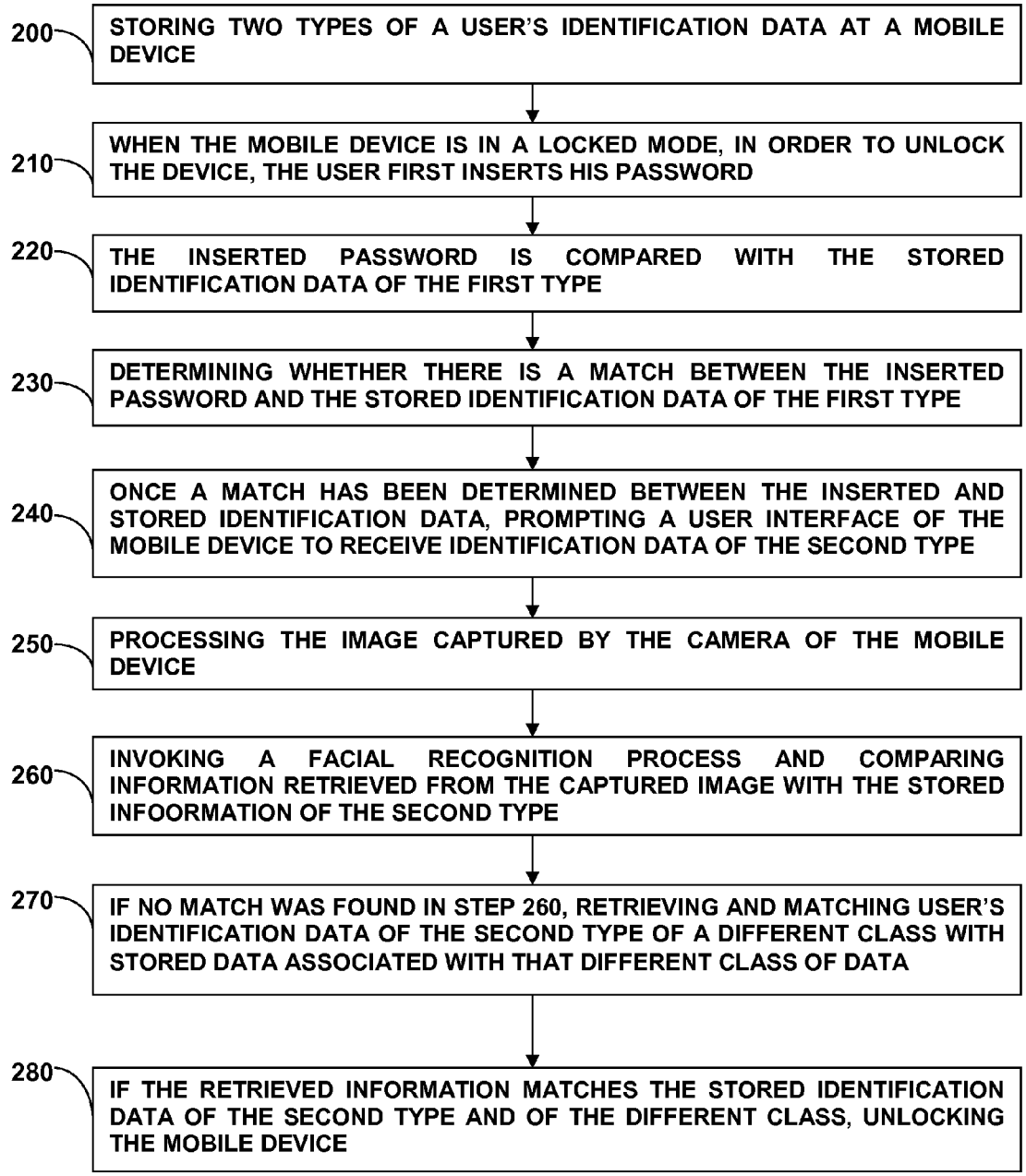
FIG. 2 is a flow chart illustrating a different embodiment of the present invention.

FIG. 2 is a flow chart exemplifying another embodiment. As in the previous example, also this example refers to a two stage authentication process for gaining access to the resources of the mobile computing device (a.k.a. unlocking the mobile computing device), wherein the first stage of the authentication process is carried out by utilizing a relatively small amount of the mobile device resources (e.g. power resources, computing resources), by inserting a password as described hereinabove (by inserting alphanumeric information or by making one or more gestures in a touch sensitive area of the mobile computing device, or a combination thereof), and the second stage, where there is a number of authenticating options, each consuming a substantially larger amount of resources that those consumed for the first stage.

Thus, according to this example, two types of identification data are stored at the memory of the mobile computing device (step 200). As explained above, the first type of identification data is characterized in that it consumes a small amount of computing resources of the mobile computing device for comparing the stored identification data of the first type with data of the first type that would be introduced to the mobile computing device (e.g. by inserting a password and comparing it to a stored password of the user). The second type of identification data is characterized in that it consumes a substantially larger amount of computing resources of the mobile computing device for comparing the stored identification data of the second type with data of the second type that would be introduced to the mobile computing device, than the identification data of the first type. For example the comparison may be carried out by invoking one or more of the following mechanisms: a facial image recognition process, a voice print analysis and fingerprint analysis.

Now, when the mobile computing device is in a locked mode, and the user wishes to access the mobile computing device resources, the authentication process starts when the user inserts his password (step 210) as explained above. Once the password related data has been inserted by the user, it is compared (step 220) with the identification data of the first type (e.g. the stored password of the user). Then, the processor of the mobile device determines whether the received data matches the stored data which is associated with the user password (step 230). As before, if the data inserted by the user does not match the data of the password that had been stored in the device memory, the device will remain in a locked mode.

However, if the password inserted by the user matches the stored data for the password, a user interface of the mobile computing device is prompt (step 240) in order to enable receipt of identification data of the second type by the mobile computation device. The term "user interface" as used herein may include a camera to capture a facial image of the user, a microphone to capture a voice print of the user, a pre-defined area of the touch screen of the mobile computing device for receiving a fingerprint of the user, as well as a keyboard for inserting the user password (step 210).

Now, let us assume that the camera is the device which has been prompt in order to capture to user facial image. The image is then processed (step 250) and a facial recognition process is invoked in order to compare information retrieved from the image captured with the information that has been stored at the memory of the mobile computing device (step 260). However, let us assume that in this example the comparing step was unsuccessful because of any one of possible reasons, such as the image was taken under poor lightening conditions, the user is the driver of a car being currently driven and cannot locate his face in front of the camera in order for the camera to capture an image that contains enough information for the comparison, etc. In such a case another device is invoked. Let us assume that in this example it is the microphone. The user may then pronounce a pre-defined combination of words (e.g. his name) which may then be converted into digital data, and the data thus obtained is then used for matching it with identification data of the second type associated with the first user (step 270), that had been stored at the memory of the mobile computing device. Upon determining that the received data of the second type (the digital form of the voice identification data) matches the stored identification data of the second type associated with the first user, the mobile computing device will be unlocked (step 280).

Figure 3:
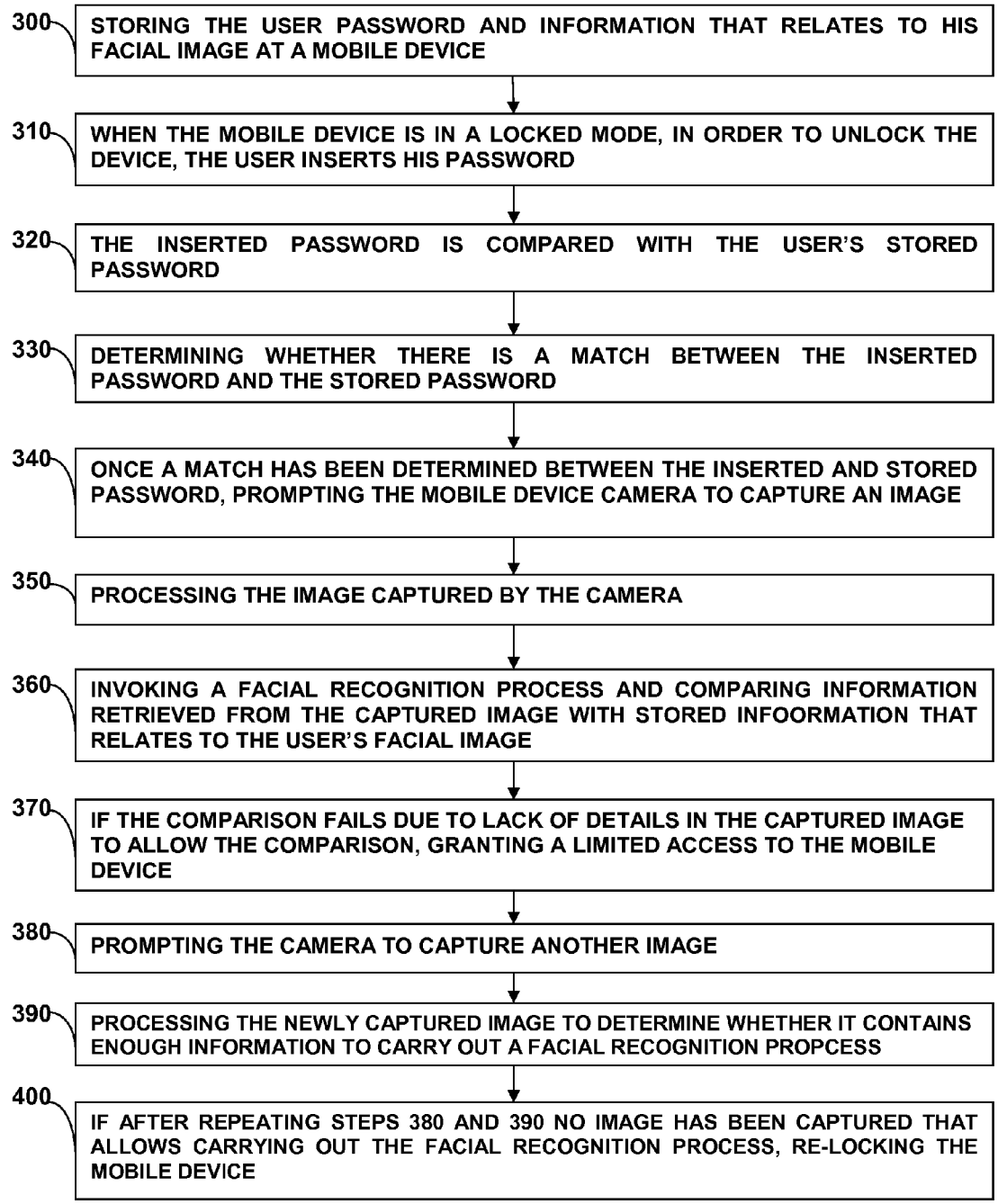
FIG. 3 is a flow chart illustrating yet another embodiment of the present invention.

FIG. 3 is a flow chart exemplifying yet another embodiment. As in the previous examples, also this example refers to a two stage authentication process for gaining access to the resources of the mobile computing device, wherein the first stage of the authentication process is carried out by inserting a password as described hereinabove and the second stage, where there is a number of authenticating options, each consuming a substantially larger amount of resources that those consumed for the first stage.

Thus, according to this example, two types of identification data are stored at the memory of the mobile computing device (step 300), namely, the user's password as well as information that relates to his facial image (e.g. that was derived by taking his own facial image using that mobile device). As explained above, the information that relates to the user's facial image may be stored in any one of a number of ways such as a digital representation of the user's image, one or more features characterizing the user's image, a facial signature of the user, etc., or any other way that is known in the art per se that would allow comparing another image of that user with the stored information.

Then, when the mobile computing device is in a locked mode and the user wishes to regain access the resources of the mobile computing device, the following steps of a two stage authentication process are taken.

First, the user inserts his password (step 310). This step can be done by inserting alphanumeric information or by making one or more gestures in a touch sensitive area of the mobile computing device (if the mobile computing device has a touch screen), or a combination thereof.

Once the password related data has been inserted by the user, it is compared (step 320) with the data associated with the user's password, which is stored at the memory of the mobile computing device. Then, it is determined whether the received data matches the password associated with that user (step 330). If the password inserted by the user does not match the stored password, the device will remain in its locked mode.

However, if the password inserted by the user does match the stored password, an image capturing device associated with the mobile computing device (e.g. its camera) is prompted to capture an image which, at a high probability is a facial image of the user currently facing the mobile computing device (step 340).

The captured image is then processed (step 350) and if it is found to contain enough details to enable invoking a facial recognition process, such a process is invoked in order to compare information retrieved from the image captured with the information that has been stored at the memory of the mobile computing device (step 360), as described in connection with FIG. 1. If the retrieved information relating to a facial image of the user who inserted the received data matches the information relating to the facial image of the user which had been stored at the memory of the mobile computing device, the mobile computing device is unlocked, and unlimited access is granted to the user to all of the mobile device resources/applications. However, if the retrieved information relating to a facial image of the user who inserted the received data has been successfully processed but does not match the information relating to the facial image of the user which had been stored at the memory of the mobile computing device, the mobile computing device remains in a locked mode, and access to the mobile computing device resources is denied from the user whose facial image has been captured and processed.

However, let us now consider a case where the image captured (step 340) cannot be used for extracting enough information in order to carry out a matching process with the information relating to the facial image of the first user which had been stored at the memory of the mobile computing device. Such a case could occur when the face of the user inserting the password is not in front of the mobile device camera, if the lightening conditions are very poor, or any other reason. In such cases, the next step of the present example is to grant limited access to the resources of the mobile computing device, to the user (step 370), in order not to have an adverse effect upon the user experience, which could have been caused had the legitimate user been forced to capture his image time and time over (e.g. in case the user is currently occupied and cannot face properly the camera) without being able to access his mobile telephone. This limited access, which is granted for a relatively short period of time, may be for example a permission to access certain applications and not others (e.g. contact list, e-mails, etc.), or can be a full access to all applications but as explained above, it will be only for a relatively short period of time.

Once the limited access has been granted, the image capturing device is prompt to capture another image, and once captured by the camera (step 380), the mobile computing device processes (step 390) the newly captured image to determine whether it contains enough information to enable carrying out a facial recognition process. If the answer is still negative, which means that the newly captured image cannot be used for extracting enough information in order to carry out a matching process with the information relating to the facial image of the first user which had been stored at the memory of the mobile computing device, repeating steps 380 and 390 for up to a pre-defined number of times. Triggering such a repetition of steps 380 and 390 can be done by any applicable method. If can be done for example, every pre-defined period of time, e.g. every 30 seconds. In the alternative, these steps can be repeated (as long as no clear image has yet been captured), following the pressing of a key at the mobile computing device keyboard (e.g. every fifth time that a key is pressed) or every x number of times that gestures are made at a touch sensitive area of the mobile computing device. The advantage of the latter option is in that it increases the chances that when the next images are captured, there would be a user in front of the camera who pressed the key or touched a touch sensitive area.

If after that pre-defined number of times, for example 3-4 times, no match has been found between the extracted information and the information relating to the facial image of the first user which had been stored at the memory of the mobile computing device, the mobile computing device will re-enter a locked mode (step 400) and will log off the user who was granted with a limited access to the mobile computing device, upon inputting the correct password.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

It should be understood that features described with respect to one embodiment may be used with other embodiments and that not all embodiments of the invention have all of the features shown in a particular figure. Variations of embodiments described will occur to persons of the art. Furthermore, the terms "comprise," "include," "have" and their conjugates, shall mean, when used in the claims, "including but not necessarily limited to." The scope of the invention is limited only by the following claims.

The invention claimed is:

1. A two stage method for logging a first user in to a mobile computing device being in a locked mode, said method comprising:

(a) storing data associated with the first user and storing information that relates to a facial image of that first user, at a memory of the mobile computing device;
(b) when the mobile computing device is in a locked mode:
  (b.1) receiving data inserted by a user who wishes to unlock the mobile computing device;
  (b.2) comparing the received data with the stored data associated with the first user and determining whether the received data matches the stored data associated with the first user;
  (b.3) if it has been determined that the received data matches the stored data associated with the first user, prompting an image capturing device associated with the mobile computing device to capture a facial image of the user who inserted the data received;
  (b.4) retrieving information that relates to a facial image of the user who inserted the received data and comparing that information with information that had been stored at the memory of the mobile computing device, wherein the latter information relates to the facial image of that first user;
(c) if the retrieved information relating to a facial image of the user who inserted the received data matches the information relating to the facial image of the first user which has been stored at the memory of the mobile computing device, unlocking the mobile computing device,
and wherein in case the image captured in step b.3 cannot be used for extracting enough information in order to carry out a matching process with the information relating to the facial image of the first user which has been stored at the memory of the mobile computing device, the method further comprises the steps of:
  (d.1) enabling limited access to resources of the mobile computing device;
  (d.2) triggering the image capturing device to capture another image and processing the newly captured image; and
  (d.3) if the newly captured image cannot be used for extracting enough information in order to carry out a matching process with the information relating to the facial image of the first user which had been stored at the memory of the mobile computing device, repeating steps d.2 and d.3 for up to a pre-defined number of times; and
  (d.4) if following that pre-defined number of times, no match has been found between the extracted information and the information relating to the facial image of the first user which had been stored at the memory of the mobile computing device, logging off the user who was granted with a limited access to the mobile computing device.

2. The method according to claim 1, wherein step d.2 is repeated for up to a pre-defined number as long as not enough information can be extracted from the newly captured image in order to carry out a matching process with the information relating to the facial image of the first user which has been stored at the memory of the mobile computing device, and wherein hitting of a key at the mobile computing device keyboard or making a gesture at a touch sensitive area of the mobile computing device, triggers capturing of a new image.

3. The method according to claim 1, wherein if the retrieved information relating to a facial image of the user who inserted the received data has been successfully processed but does not match the information relating to the facial image of the first user which had been stored at the memory of the mobile computing device, denying access to the mobile computing device resources from the user whose facial image has been captured and processed.

4. The method according to claim 1, wherein the retrieval of information that relates to a facial image of the user comprises processing the facial image to identify therefrom at least one characteristic of the user.

5. The method according to claim 1, wherein the processing of the facial image comprises extracting at least one unique facial signature from the user facial image and matching each of the at least one extracted unique signatures with facial signatures related data comprised in the memory of the mobile computing device.

6. The method according to claim 1, wherein the processing of the facial image is carried out by using an image capturing device which is different from the image capturing device operatively coupled with the mobile computing device, for generating the information that relates to a facial image of the first user that has been stored at a memory of the mobile computing device.

7. A mobile computing device comprising:
  a power source;
  an image capturing device;
  a user interface configured to enable a user to insert a password;
  a memory or storage device storing: a) a password associated with the first user; b) information that relates to a facial image of the first user; c) a program;
  one or more processing units operable to execute the program, wherein the execution of the program causes the one or more processing units to carry out the following operations when the mobile computing device is in a locked mode:
    to process data inserted via the user interface by a user who wishes to unlock the mobile computing device;
    to compare the inserted data with the password associated with the first user that has been stored at the memory or storage device and to determine whether the inserted data matches the password associated with the first user;
    if the inserted data matches the password associated with the first user, prompting the image capturing device to capture a facial image of the user who inserted the data;
    to retrieve information that relates to a facial image of the user who inserted the data and to compare that information with information that has been stored at the memory or storage device, wherein the latter information relates to the facial image of the first user;
    if the retrieved information which relates to a facial image of the user who inserted the data matches the information which has been stored at the memory or storage device and relates to the facial image of the first user, prompting the unlock of the mobile computing device,
  and wherein in case the facial image of the user who inserted the data that was captured by the image capturing device, cannot be used for extracting enough information in order to carry out a matching process with the information relating to the facial image of the first user which had been stored at the memory of the mobile computing device, the one or more processing units are further configured to carry out the following operations:
    to enable limited access to resources of the of the mobile computing device;
    to prompt the image capturing device to capture another image and to process the newly captured image; and if the newly captured image cannot be used for extracting enough information in order to carry out a matching process with the information relating to the facial image of the first user which had been stored at the memory of the mobile computing device, repeating the steps of capturing the image and processing it for up to a pre-defined number of times; and if after that pre-defined number of times, no match has been found between the extracted information and the information relating to the facial image of the first user which has been stored at the memory of the mobile computing device, to automatically log off the user to a limited access to the mobile computing device was granted.

8. The mobile computing device according to claim 7, wherein the one or more processing unit are configured to repeat prompting the image capturing device to capture an image and to process it for up to a pre-defined number of times, as long as the newly captured image cannot be applied for extracting enough information in order to carry out a matching process with the information relating to the facial image of the first user which has been stored at the memory of the mobile computing device, and wherein hitting a key at the mobile computing device keyboard or making a gesture at a touch sensitive area of the mobile computing device, triggers the prompting of capturing a new image.

9. The mobile computing device according to claim 7, wherein if the retrieved information relating to a facial image of the user who inserted the received data has been successfully processed but does not match the information relating to the facial image of the first user which had been stored at the memory of the mobile computing device, the one or more processing units are configured to deny access to the mobile computing device resources from the user whose facial image has been captured and processed.

* * * * *